Patented Aug. 14, 1945

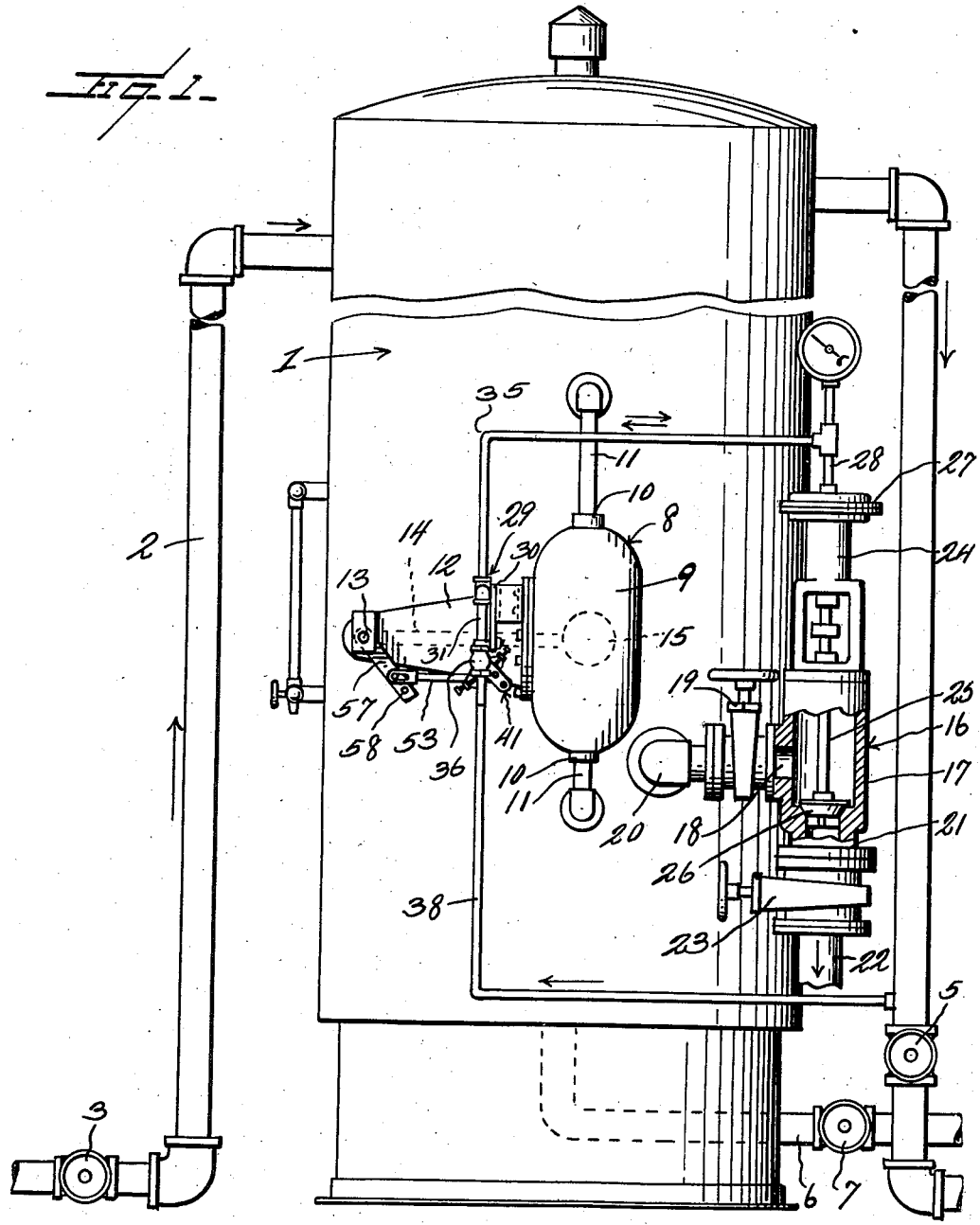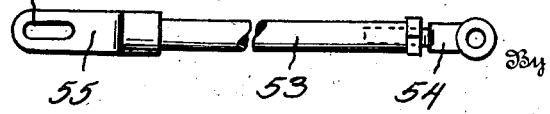

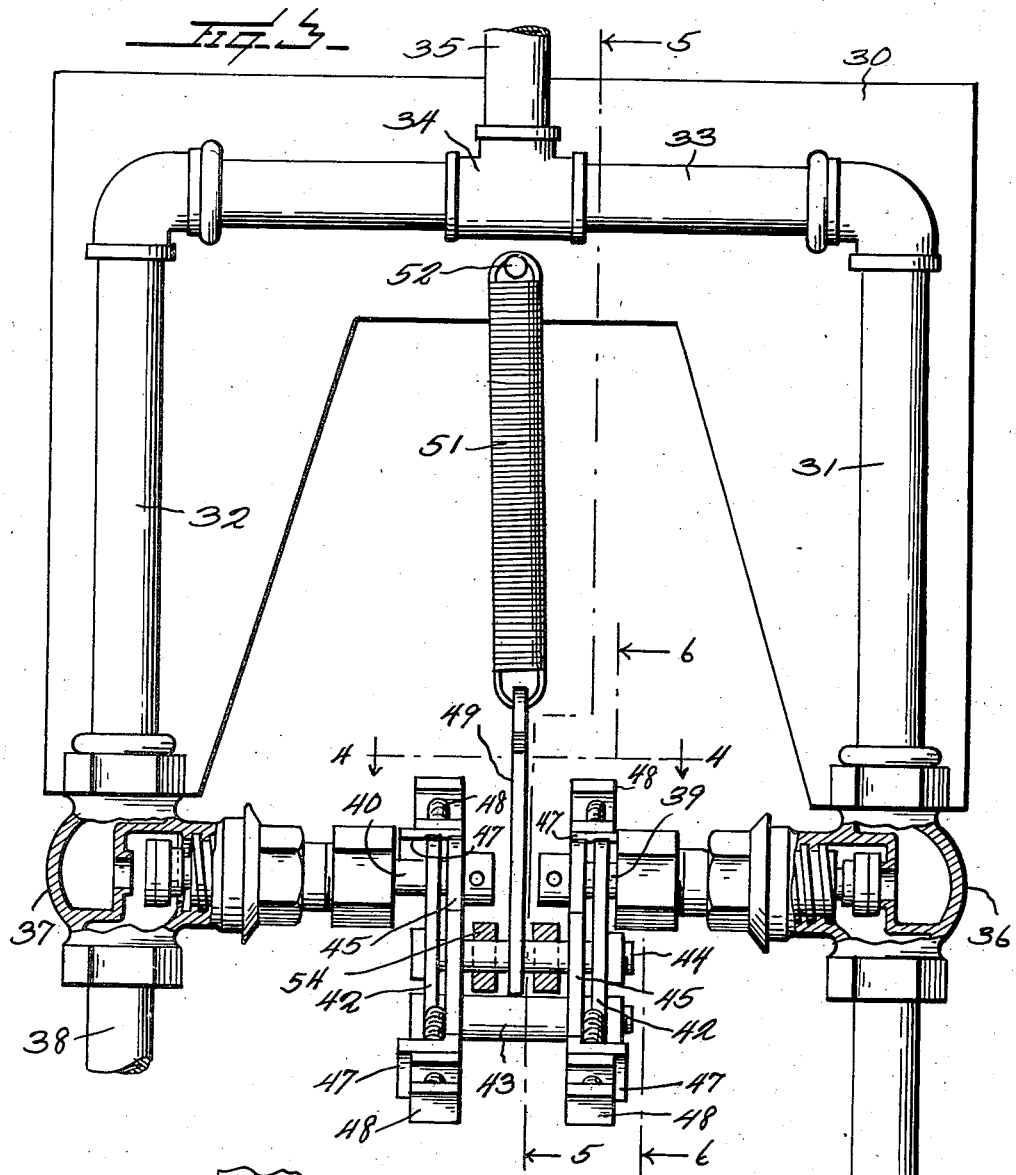

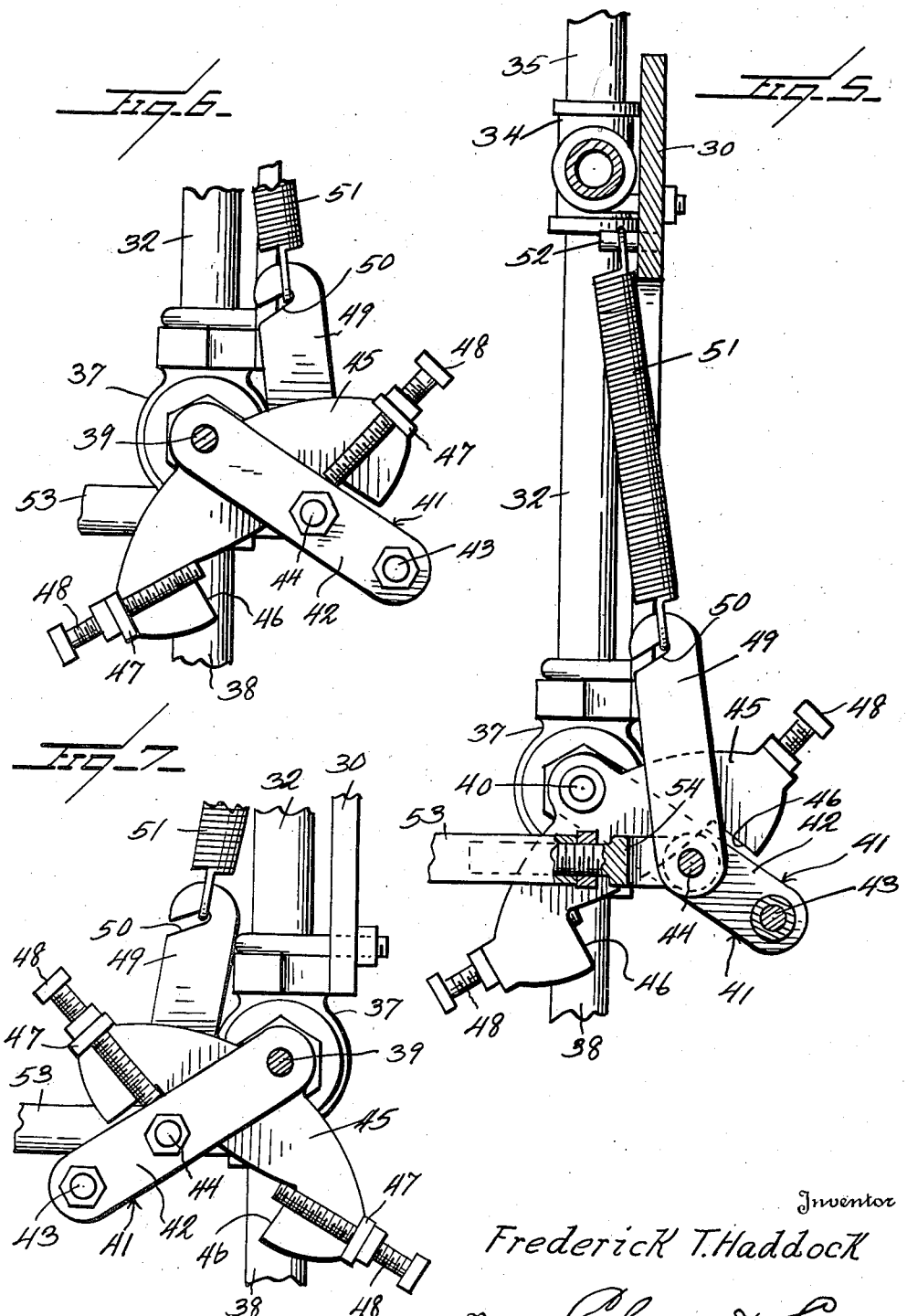

2,382,710

UNITED STATES PATENT OFFICE 2,382,710

PILOT VALVE FOR OIL AND GAS SEPARATORS

Frederick T. Haddock, Texon, Tex.

Application August 14, 1942, Serial No. 454,881

3 Claims. (Cl. 74—97)

This invention relates primarily to an improved pilot valve mechanism designed for use in connection with an oil and gas separator, the mechanism, however, being capable of use in connection with other mechanisms where a quick acting means may be required for opening and closing pipe lines, electric circuits or the like.

In oil and gas separating tanks use is made of the natural gas pressure which develops in the separating tank for alternately opening valves controlling gas and oil outlet lines. The present mechanism has for its principal object to provide a novel means actuated by a float which is controlled by the rise and fall of the fluid level in the separator tank, for rapidly opening and closing a pilot gas pressure line valve for the employment of the gas pressure for the operation of a motor valve which in turn controls the flow of oil from the tank, and for simultaneously opening, during the closing of the gas line valve, and closing, during the opening of the gas line valve, an exhaust or release valve for checking or releasing the exhaust of gas from the motor valve.

Another object of the invention is to provide a mechanism for simultaneously operating the control and exhaust valves rapidly and positively and holding such valves, one opened and the other closed, as a control float within the tank rises or falls past a predetermined level for the fluid in the tank.

The invention will be best understood from a consideration of the following detailed description taken in connection with the accompanying drawings, it being understood, however, that the invention is not to be considered as limited by the specific illustration or description but that such illustration and description constitute a preferred embodiment of the invention.

In the drawings:

Figure 1 is a view in elevation of a standard tank for separating oil and gas, showing in side elevation the mechanism embodying the present invention connected with an oil level actuated float mechanism of standard construction.

Figure 2 is a view in elevation of the pull link by which the trip mechanism is actuated.

Figure 3 is a view in front elevation of the pilot valve mechanism, parts being in section.

Figure 4 is a section taken substantially on the line 4—4 of Figure 3.

Figure 5 is a sectional view taken on the line 5—5 of Figure 3.

Figure 6 is a sectional view taken on the line 6—6 of Figure 3.

Figure 7 is a sectional view on the same line as Figure 6 but showing the parts in the reverse position.

Referring now more particularly to the drawings, the numeral 1 designates a conventional oil and gas separator tank into the upper part of which is run the oil feed or supply pipe 2 which is provided with the usual or conventional control valve 3.

The numeral 4 designates the gas outlet pipe line which leads from the upper part of the tank 1 and which has a control valve 5 therein while the cleanout or blow-off pipe which leads from the bottom of the tank is indicated by the numeral 6 and has a shut-off valve 7 in the usual manner.

At the side of the tank is located what is known in the oil fields as the "kidney valve" which is generally indicated by the numeral 8. This unit is, in fact, not a valve but is a float actuated means for controlling the pilot valve which is employed for regulating the discharge of oil from the tank. The unit 8 comprises a vertically disposed elongated housing 9 having suitable nipples or connections 10 at its upper and lower ends for the connection therewith of the upper and lower pipes 11 which open into the housing 9 and also into the tank so that as the oil level rises in the tank the oil will flow into the housing 9 in which it will rise and fall at the same level.

Secured to the side of the housing 9 is an arm 12 upon the outer end of which is oscillatably supported the transversely extending rock shaft 13, which shaft is coupled with the lever arm 14 which extends from the rock shaft lengthwise of the arm 12 and into the housing 9 where it carries a float 15.

The construction and operation of the unit 8 are well-known to those versed in the art and, therefore, a more detailed description of the parts of this unit and its operation or illustration of such parts is considered unnecessary.

The numeral 16 generally designates the motor valve which controls the flow of oil from the tank to the points to which it is distributed. This valve includes the casing 17 having the inlet 18 controlled by a gate valve 19 and receiving the oil from the outlet 20 of the tank, and the outlet 21 which connects with the carry-off pipe 22 through a control valve 23.

The upper part of the motor valve is of standard well-known construction, including a housing guide 24 through which extends the valve stem 25 and in which is enclosed a spring, not shown, which normally urges the valve 26 to opened position. Above the housing 24 is located a housing 27 for a fluid actuated diaphragm, not shown, which is operatively coupled with the valve stem 25 and which when forced down closes the valve 26. The upper end of the diaphragm housing 27 has a fluid inlet pipe 28 for the admission of the selected control fluid.

The pilot valve embodying the present invention is indicated generally by the reference 29 and is mounted, by means of a suitable mounting bracket or plate 30, upon the housing 9 at the inner end of the arm 12, as shown in Figure 1. In this figure the mounting plate 30 is shown in edge elevation and is disposed at one side of the arm 12, as shown, with the broad side of the plate upon which the hereinafter described mechanism is mounted, facing in the direction of the outer end of the arm 12.

Figure 3 shows in elevation the pilot valve mechanism which is supported upon the plate 30. This plate is in the form of an inverted U, as shown, and against the face thereof are secured the two vertical pipes 31 and 32 which are connected at their upper ends by the transverse pipe line 33, at the center of which is a T coupling 34 from the lateral arm of which extends the pipe 35 which connects with the pipe 28 of the diaphragm housing 27 to carry gas to and from such housing in the manner hereinafter described.

The pipes 31 and 32 have connected with their lower ends the respective exhaust and supply valves 36 and 37. The opposite side of the exhaust valve 36 opens to the atmosphere, while the supply valve has connected with its other side the gas supply pipe line 38 which leads from and is connected with the gas discharge pipe 4 leading from the tank.

As shown in Figure 3, the valves 36 and 37 have threaded rotatable stems 39 and 40, respectively, which are arranged in aligned end-opposed relation. The threads of the stems of these valves are of the same hand.

The adjacent ends of the valve stems 39 and 40 are connected by and support the freely swinging or oscillatable yoke 41 which comprises the two spaced parallel rocker arms 42, each of which is suspended for free turning movement upon a valve stem, and the cross bar 43 connecting the outer ends of the rocker arms. In addition to the cross bar 43 the arms are connected inwardly of their ends by the thrust pin 44, the function of which will be hereinafter pointed out.

Secured to and extending transversely of each of the valve stems 39 and 40 is the trip plate 45, the oscillation of which effects the turning of the valve stem to which it is applied to effect the opening or closing of the valve. Each of these trip plates is cut out in its lower edge to form the spaced movement limiting shoulders 46 between which the thrust pin moves, and each end of each trip plate has a laterally turned ear 47 which extends across the plane of movement of the adjacent rocker arm 42, as is clearly shown in Figures 3 and 4.

Each of the ears 47 has a threaded aperture therethrough, not shown, in which is adjustably mounted a stop or movement limiting pin or screw 48 against which the adjacent rocker arm 42 engages, as shown in Figures 5 to 7.

Connected with the thrust pin 44 is an end of a trip link 49, the opposite end of which is formed to provide a hook 50 with which is connected one end of a trip spring 51, the other end of the spring being attached in a suitable manner, as by means of the pin 52, to the overlying portion of the mounting plate 30. This spring is constantly under tension and exerts an upward pull upon the yoke 41, which yoke in turn maintains the trip plates 45 at the extreme of one or the other of their two positions of movement. These trip plates 45 are substantially parallel and they swing back and forth between two extreme positions. When in one of the extreme positions of movement one of the trip plates, during such movement, turns the valve stem to which it is attached to close the valve, while the other trip plate turns the valve stem to which it is attached, to open the valve. Consequently, when the two plates are swung back to the opposite extreme position of movement the valves will be reversed, the open one closing and the closed one opening.

Actuation of the yoke 41 is effected through the medium of the pull link 53. One end of this link is adjustably coupled by the clevis 54 with the thrust pin 44, while the other end of the link has the elongated head 55 in which is formed the longitudinal slot 56. This slotted end of the pull link 53 is operatively coupled with the rock shaft 13 by means of the crank arm 57 which is attached to the rock shaft 13 and, as shown in Figure 1, extends downwardly and carries a pin 58 which engages in the slot 56 of the pull link. Thus, when the crank 57 swings from the position in which it is shown in Figure 1, to the left, it will pull the link 53 and cause oscillation of the yoke 41. As the yoke 41 swings downwardly and under the valve stems the spring 51 will be placed under greater tension and as soon as the thrust pin 44 passes dead center the reaction of the spring 51 will snap the yoke 41 upwardly and forcibly contact the arms 42 with the adjacent movement limiting or stop screws 48 and cause the rapid oscillation or snapping over of the trip plates 45.

In the operation of the oil and gas separator, when the oil in the tank is below a certain level, the supply valve 37 will be opened and the exhaust valve 36 will be closed, as shown in Figure 3. The gas from the upper part of the tank may then flow from the pipe 4, through the pipe 38, the valve 37, the pipe 32, to and through the pipe 35 into the diaphragm casing 27 to force the diaphragm down and maintain the valve 26 closed, thereby preventing oil from flowing out of the tank. As the oil rises in the tank the float 15 will be raised and will swing the crank 57 so as to impart thrust upon the link 53 until the yoke 41 is caused to snap over to the position in which it is shown in Figure 1. This will cause oscillation of the trip plates 45 in the manner previously stated and result in the rapid closing of the supply valve 37 and opening of the exhaust valve 36. This permits the compressed gas to escape from the diaphragm casing 27 so that the motor valve operates to open, under the action of its control spring, not shown, thereby opening the outlet and permitting oil to flow from the tank.

When the oil level drops in the tank to the required extent the float 15 will lower and cause the reverse movement of the pull link 53 and reverse swinging of the yoke 41 so as to return the valves 36 and 37 to the positions in which they are shown in Figure 3, thereby allowing the gas to build up pressure in the diaphragm chamber and bring about a closing of the motor valve.

While the pilot valve structure was designed primarily for the control of valves in a pair of fluid lines or, in other words, for use in association with a gas and oil separator, it will be readily apparent that the trip mechanism may be adapted to other uses such, for example, as the rapid opening and closing of electric switches.

I claim:

1. Mechanism for actuating a pair of control shafts between limits, the shafts being in end opposed, spaced relation, comprising a rock shaft, means for rocking the same, a crank connected with said rock shaft, a pull link connected at one end with the crank, means connected between the other end of the pull link and the control shafts for imparting turning movement to the control shafts upon swinging movement of the crank, said pull link when shifted in one direction effecting the turning of one control shaft in one direction and the turning of the other control shaft in the opposite direction and when shifted in the opposite direction effecting the reverse turning of each of the said control shafts.

2. A mechanism as set forth in claim 1, in which the said connecting means between the pull link and the control shafts comprises a pair of arms supported for free swinging movement on the axes of the control shafts, a pair of stops secured to each control shaft to turn therewith and spaced transversely of the control shafts, each pair of stops having an arm disposed therebetween, and spring means operatively coupled with the arms to effect accelerated movement of the arms each into contact with a stop of the adjacent pair upon the shifting of the arms by said pull link beyond a dead center position.

3. A mechanism as set forth in claim 1, in which the connecting means between the pull link and the control shafts comprises a pair of arms each suspended from a control shaft for free swinging movement and with which the pull link is pivotally connected, a pair of elongated plates secured to each control shaft adjacent an arm, each plate supporting a pair of spaced stops between which the adjacent arm swings for selective contact with the stops, a trip spring connected at one end with said arms and connected at a fixed point at its other end upon the side of the turning axis for the arms remote from its point of connection with the arms, said spring functioning to snap the arms over from a position of contact with one stop into forcible contact with the opposite stop upon movement of the arms past dead center by said link, and said link having a loose connection with said crank for facilitating an overrunning movement with respect to the crank.

FREDERICK T. HADDOCK.